(12) United States Patent
Fournier et al.

(10) Patent No.: US 7,681,833 B2
(45) Date of Patent: Mar. 23, 2010

(54) TURBOPROP UNIT FOR AIRCRAFT WITH IMPROVED AERODYNAMIC INSTALLATION

(75) Inventors: Alain Fournier, Le Plessis Robinson (FR); Bernard Laboure, Velizy (FR); Robert Standish, Saint-Cloud (FR)

(73) Assignee: Aircelle, Harfleur (FR)

( * ) Notice: Subject to any disclaimer, the term of this patent is extended or adjusted under 35 U.S.C. 154(b) by 614 days.

(21) Appl. No.: 11/587,355

(22) PCT Filed: Apr. 19, 2005

(86) PCT No.: PCT/FR2005/000940
§ 371 (c)(1),
(2), (4) Date: Oct. 24, 2006

(87) PCT Pub. No.: WO2005/110845
PCT Pub. Date: Nov. 24, 2005

(65) Prior Publication Data
US 2007/0217913 A1   Sep. 20, 2007

(30) Foreign Application Priority Data
Apr. 27, 2004 (FR) .................................. 04 04445

(51) Int. Cl.
*B64D 27/00* (2006.01)
(52) U.S. Cl. ..................... 244/54; 244/53 R; 244/129.4
(58) Field of Classification Search ............... 244/53 R, 244/54, 110 B, 129.4
See application file for complete search history.

(56) References Cited

U.S. PATENT DOCUMENTS

| 5,203,525 | A | | 4/1993 | Remlaoui |
| 5,755,403 | A | * | 5/1998 | Marche ........................ 244/54 |
| 5,775,638 | A | * | 7/1998 | Duesler ........................ 244/54 |
| 5,941,061 | A | * | 8/1999 | Sherry et al. .................. 60/798 |
| 6,227,485 | B1 | * | 5/2001 | Porte ............................ 244/54 |

FOREIGN PATENT DOCUMENTS

| EP | 0 744 339 | 11/1996 |
| EP | 1 174 341 | 1/2002 |

\* cited by examiner

*Primary Examiner*—Michael R Mansen
*Assistant Examiner*—Philip J Bonzell
(74) *Attorney, Agent, or Firm*—Young & Thompson

(57) ABSTRACT

A turboprop engine includes a power jet mounted coaxially to the engine axis (X-X'), and has a fan case and a gas ejecting system provided with two afterbody half-cowlings ($10b$) each of which is pivotable around an axis ($A_2$) between open and closed positions, wherein the half-cowlings are connected to the downstream of the fan case through a 'V-blade/V-groove' system. In a first embodiment, the pivot axes ($A_2$) make an angle $\alpha > 3°$ to the engine axis (X, X') and a joint plane ($Z_2$-$Z_2$) between the afterbody half-cowlings and the downstream of the fan case makes to the plane (Y, Y') perpendicular to the engine axis (X, X') an angle $\beta$ in such a way that the difference between the angle $\alpha$ and the angle $\beta$ is less than or equal to 3°. In the other embodiment, the axes are converged to each other in a downstream direction.

10 Claims, 4 Drawing Sheets

TURBOPROP UNIT FOR AIRCRAFT WITH IMPROVED AERODYNAMIC INSTALLATION

BACKGROUND OF THE INVENTION

The present invention relates in a general way to a turboprop unit for an aircraft, comprising in particular, from upstream to downstream with respect to the direction of gas flow, a jet engine having a fan casing and a gas exhaust system, these being coaxial with an engine axis, the said gas exhaust system including two afterbody half-cowlings, called D-ducts, each hinged about an axis, enabling them to move, for the purposes of maintenance operations, from a closed position to an open position.

In the closed position, the said afterbody half-cowlings are also connected to the downstream end of the fan casing via a means for sealing and strain transmission, having complementary male and female profiles, called a "V-blade/V-groove" system, the male profile belonging to the afterbody half-cowlings and the female profile belonging to the fan casing side.

In the known art, the downstream outlet plane of the fan casing is strictly perpendicular to the engine axis, and the hinge axes of the half-cowlings are parallel to each other and inclined at an angle α with respect to the engine axis, this angle not being allowed to exceed 2 to 3 degrees, because above this value it would be difficult for the "V-blade/V-groove" system to engage correctly, owing to a "chisel" effect, and, furthermore, the increased friction caused by such a difficult engagement would lead to premature wear.

However, it would be useful to increase this angle α in order to reduce the amount of projection caused by the fairing of the hinges forming the hinge axes of the afterbody half-cowlings. This is because this projection complicates the aerodynamic design of the area in question.

SUMMARY OF THE INVENTION

The present invention provides a solution enabling the angle α to be increased while maintaining correct operation of the "V-blade/V-groove" system.

Thus, according to the invention, the angle α formed between the hinge axes and the engine axis is greater than 3°, and the plane of the joint between the afterbody half-cowlings and the downstream end of the fan casing forms an angle β with the plane perpendicular to the engine axis such that the difference between the angle α and the angle β is less than or equal to approximately 3°.

Clearly, this requires a modification of the rear of the jet engine fan casing and of the front of the afterbody half-cowlings carrying the female and male components, respectively, of the "V-blade/V-groove" system, but it provides a significant reduction in the projection of the aforesaid hinges.

However, the angles α and β cannot be increased to any value, since an excessively large angle β would introduce strains not parallel to the engine axis in the engine casing structure, leading to problems of mechanical strength.

Consequently, the angle α is preferably less than or equal to 6°.

If the jet engine is fitted under a wing, the hinge axes of the afterbody half-cowlings are fixed to a pylon, which is a faired structure integrated into the structure of the said wing and, in the known art, the hinge axes are strictly parallel to each other and to the axis of the pylon.

To achieve a further reduction in the projection due to the presence of the hinges forming these hinge axes, the invention proposes, in addition to the increase in the angle α and in the inclination β of the plane of the "V-blade/V-groove" system, or as a variant of these means, the convergence of the said hinge axes towards each other in the downstream direction.

The angle of convergence, with respect to the axis of the pylon, is preferably about 1°, and therefore the angle between the hinge axes is about 2°.

BRIEF DESCRIPTION OF THE DRAWINGS

The invention will be made clearer by the following description, provided with reference to the attached drawings, in which.

DETAILED DESCRIPTION OF THE PREFERRED EMBODIMENTS

In the following description, the same references are used from one figure to the next to indicate identical or similar parts.

Figure 1:
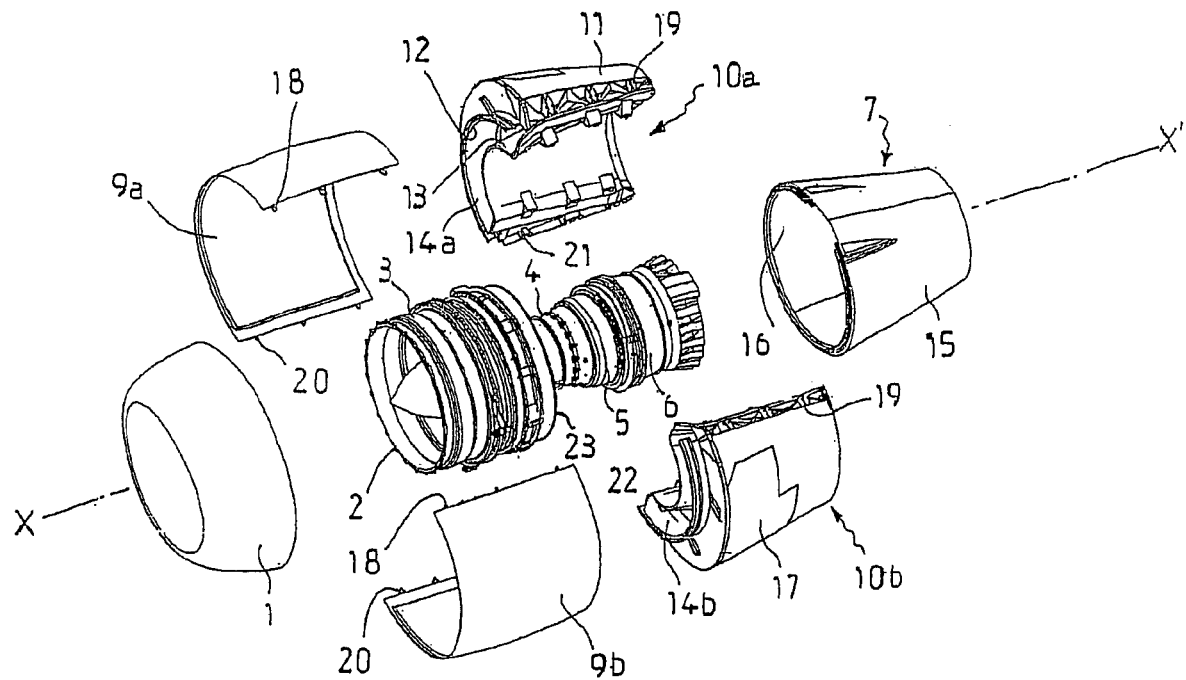
FIG. 1 is an exploded perspective view of the propulsion system of the Airbus A318 engine (underwing nacelle), illustrating the prior art.

FIG. 1 shows a propulsion system according to the prior art, in which can be seen the air intake 1, the fan 2, the fan casing 3, the compressors 4, the combustion chamber 5, the turbine casing 6, and the exhaust nozzle which is a common exhaust nozzle 7 (for mixed hot and cold gases), generally termed a CNA, standing for "common nozzle assembly".

The system also includes an engine cowl in two parts, 9a and 9b, and an afterbody cowling in two parts, 10a and 10b, adapted to surround the assembly formed by the compressors 4, the combustion chamber 5 and the turbine casing 6, the division of the engine cowl and the afterbody cowling into two parts being made along a substantially vertical cutting plane. Each afterbody half cowling 10a, 10b, generally termed a D-duct, has three aerodynamic surfaces or skins, namely an outer nacelle surface 11, an outer fan channel surface 12 and an inner fan channel surface 13. The surfaces 12 and 13 delimit half fan channels (cold flow) 14a and 14b respectively. The CNA 7, which in normal operation is connected to the afterbody half-cowlings, has two aerodynamic surfaces, namely the outer nacelle surface 15 and the inner surface 16 for the mixed hot and cold flow channel. Thrust reverser ports 17 are fitted in the cowling 10a, 10b to act on the cold flow.

The engine cowl and the afterbody cowling are each formed from two halves 9a, 9b and 10a, 10b respectively, but the common nozzle or CNA 7 is made in one piece. The half-cowls 9a and 9b and the half-cowlings 10a and 10b are fitted by hinging on the engine beam (not shown) by means of the hinges 18 and 19 respectively. At the opposite ends from the hinges, the half-cowls 9a, 9b and the half-cowlings 10a, 10b have locks such as 20 and 21, enabling them to be locked in the closed position. Clearly, the purpose of this fitting in two hinged parts is to allow easier access to the cold and hot parts of the jet engine.

Figure 2:
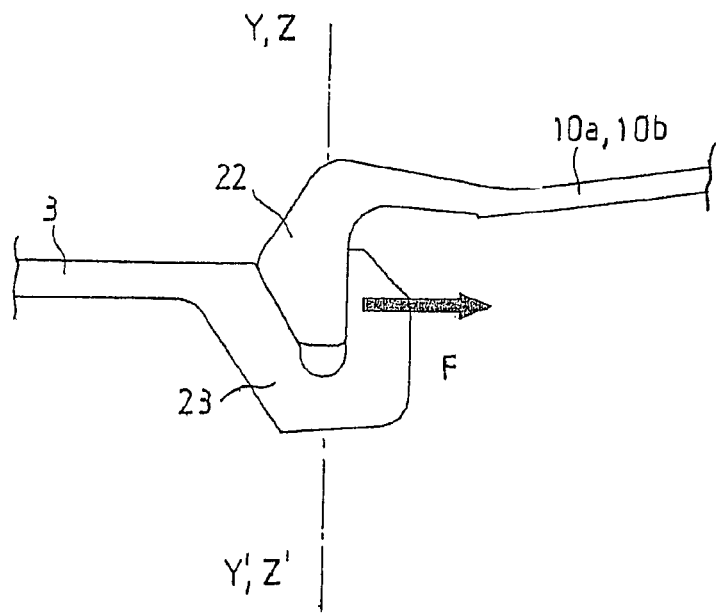
FIG. 2 is a diagram of a "V-blade/V-groove" system.

The afterbody half-cowling 10a, 10b is fixed to the engine by means of structures called V-blade/V-groove, whose position on the upstream end of the half-cowling 10b is shown at 22, for connection to the fan casing 3. Complementary structures such as 23 (FIG. 2) are placed in a facing position on the said casing.

Figure 4:
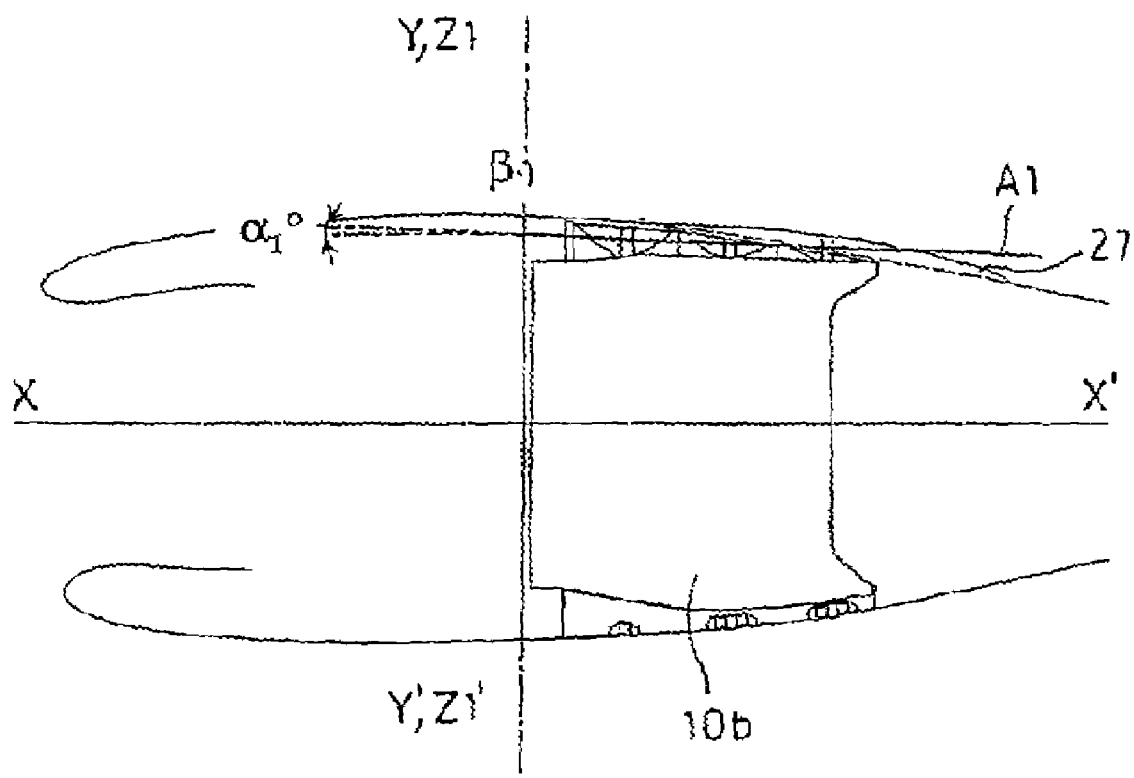
FIG. 4 is a section through the nacelle of FIG. 3, taken in a vertical plane.

The joint plane Z-Z' ($Z_1$-$Z_1$' in FIG. 4) of the "V-blade/V-groove" system coincides with a plane Y-Y' perpendicular to the engine axis X-X', so that the angle $\beta_1$ (FIG. 4) between the two planes is zero.

A similar "V-blade/V-groove" system is provided between the downstream edge of the half-cowlings 10a, 10b and the upstream edge of the CNA 7, and, in this case also, the joint plane of the "V-blade/V-groove" system coincides with a plane perpendicular to the engine axis X-X'.

Figure 3:
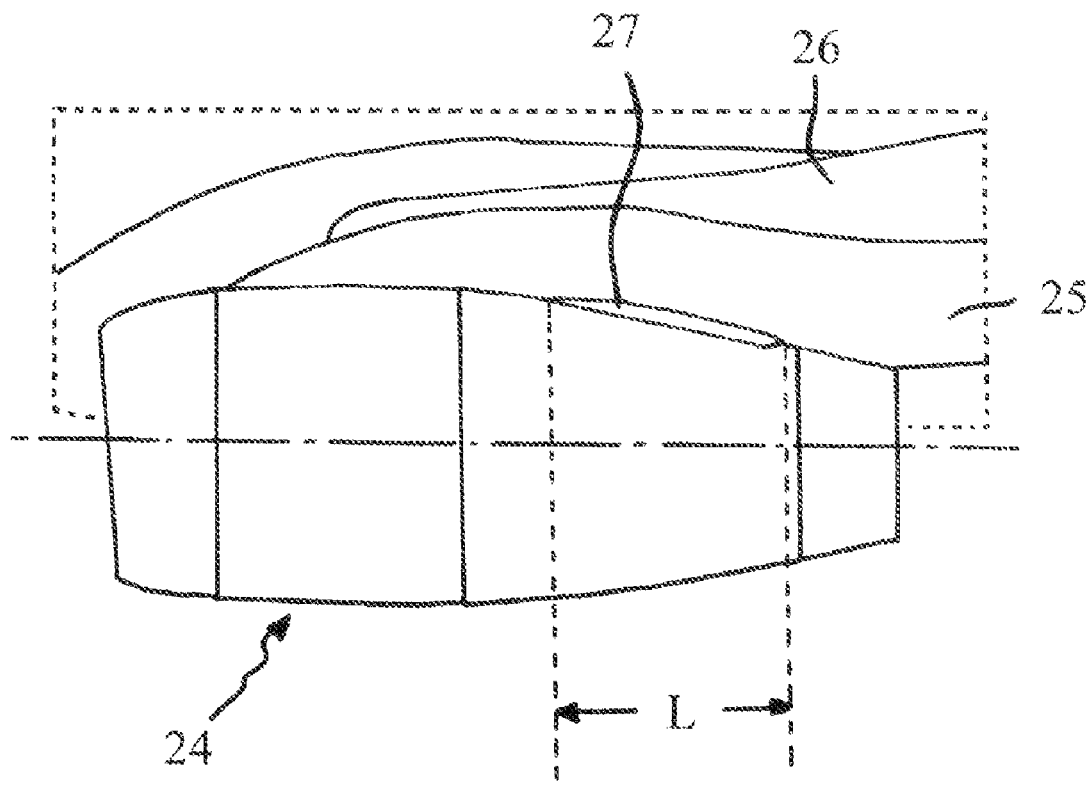
FIG. 3 shows a partial profile view of an underwing nacelle according to the prior art.

FIG. 3 shows a nacelle 24 fitted to a pylon 25 extending from the wing 26 of an aircraft. As shown, an area indicated by 27, of length L, projects from the overall profile of the nacelle 24. This is due to the presence of the fairing of the hinges 19, which are positioned along a hinge axis A1 (FIG. 4) which forms an angle $\alpha_1$<3° with the engine axis X-X'.

According to the invention, this angle is increased to $\alpha_2$>3, in such a way that the hinge axis now occupies the position $A_2$ and simultaneously an angle $\beta_2$ is created between the joint plane of the "V-blade/V-groove" system, which thus becomes $Z_2$-$Z_2$', and the plane Y-Y'.

This angle $\beta_2$ is such that $\alpha_2$-$\beta_2$≦3.

Figure 5:
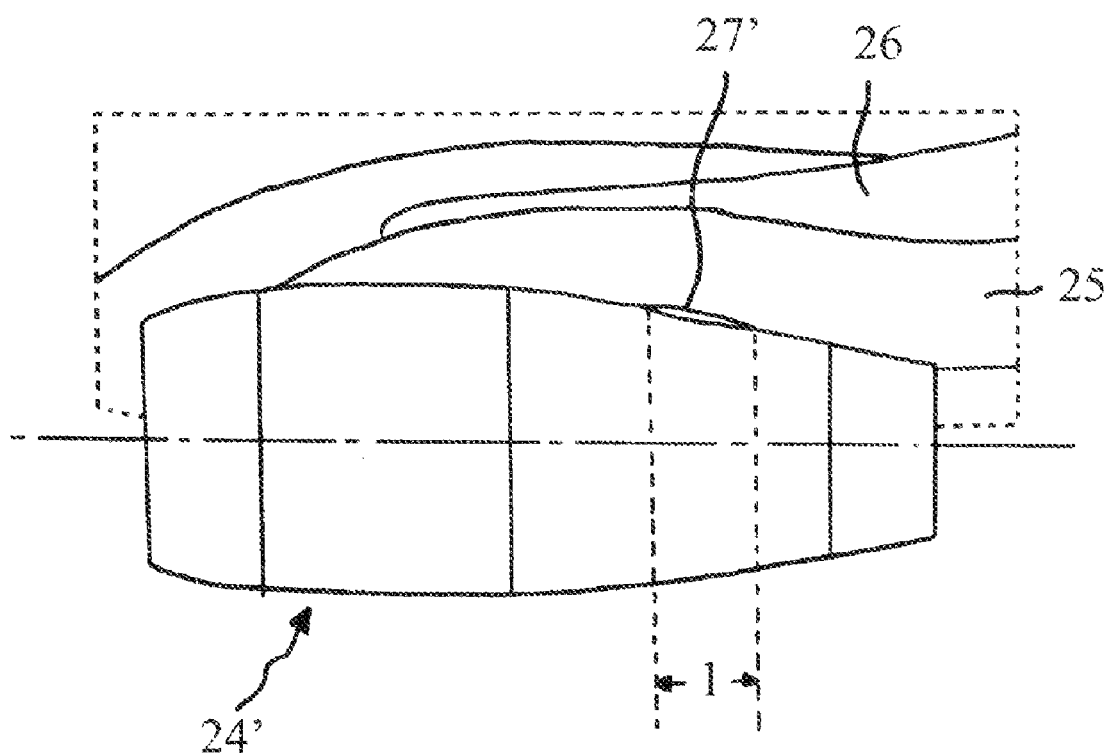
FIG. 5 shows a partial profile view of an underwing nacelle according to the invention.
Figure 6:
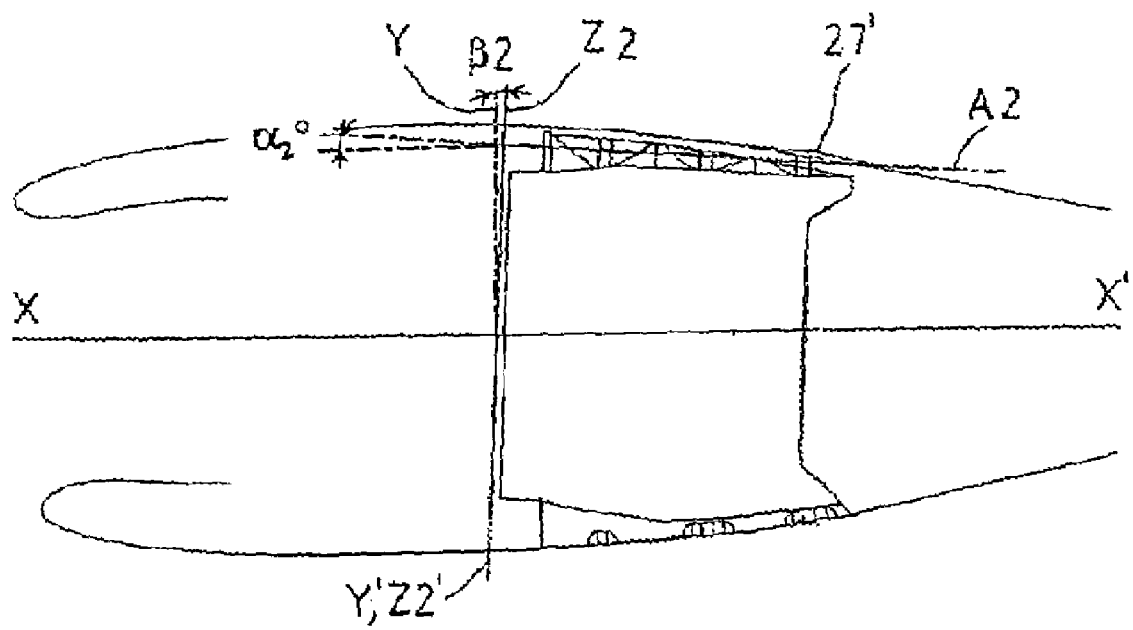
FIG. 6 is a section through the nacelle of FIG. 5, taken in a vertical plane.

As shown in FIGS. 5 and 6, this produces a very significant reduction in the projection, which becomes 27', as regards both the length, which changes from L to l, and the height.

Clearly, the joint plane of the "V-blade/V-groove" system between the downstream edge of the afterbody half-cowlings 10a, 10b and the upstream edge of the CNA 7 must, according to the invention, be inclined at an angle $\beta_2$ with respect to the plane perpendicular to the engine axis X-X', as must the joint plane of the "V-blade/V-groove" system between the upstream edge of the half-cowlings 10a, 10b and the downstream edge of the fan casing 3.

Figure 7:
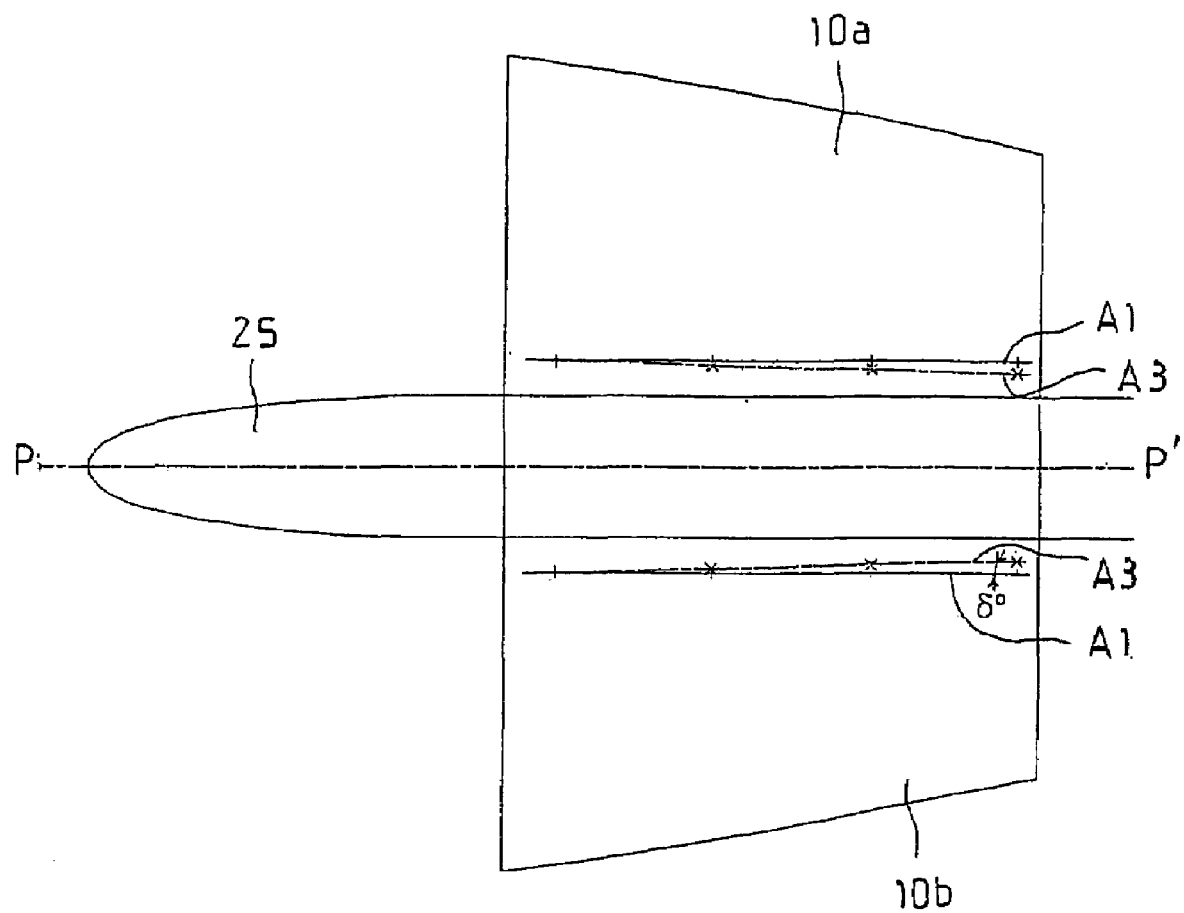
FIG. 7 is a diagram showing, from above, the pylon and the afterbody half-cowlings with their hinge axes.
Figure 8:
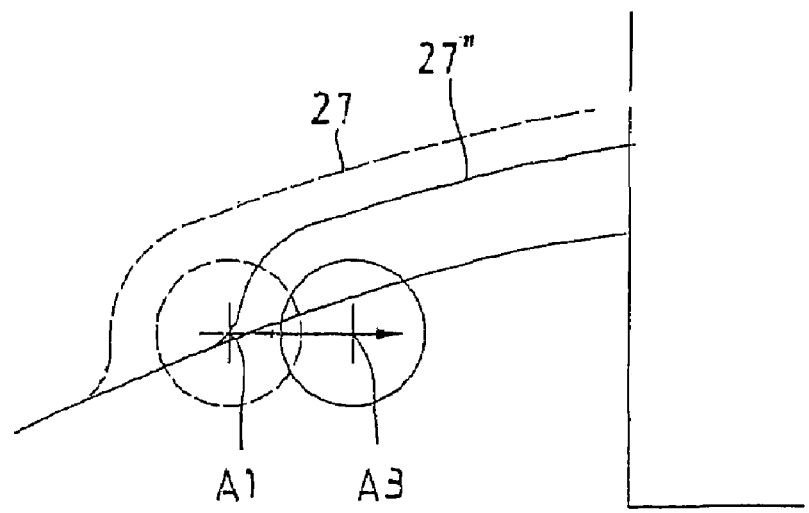
FIG. 8 is a schematic section taken in the rear area, showing the effect of the position of the hinge axes on the amount of projection seen in the fairing due to the presence of the hinges.

The projection can be reduced further by taking another step shown in FIGS. 7 and 8.

FIG. 7 shows schematically the pylon 25 and the two afterbody half-cowlings 10a, 10b with their hinge axes.

In the prior art, the hinge axes occupy the position A1; in other words, they are parallel to each other and to the longitudinal axis P-P' of the pylon 25. This position corresponds to the projection shown at 27 in FIGS. 3, 4 and 8.

However, if these axes are made to converge slightly towards the rear or downstream end, at an angle δ with respect to the axis P-P', thus moving them to $A_3$, there is a marked reduction in the projection, shown at 27" in FIG. 8.

Thus by combining these two steps (greater inclination of the hinge axes with respect to the engine axis, with appropriate inclination of the joint plane of the "V-blade/V-groove" system, on the one hand, and convergence of the hinge axes with respect to the axis of the pylon, on the other hand) it is possible to achieve a substantial reduction of the projection size, which is beneficial in terms of the aerodynamic design of the nacelle/pylon/wing area.

Although the invention has been described mainly in relation to a long mixed-flow nacelle, it is also clearly applicable to a short separate-flow nacelle. Similarly, although the invention has been described in application to an "underwing engine" configuration, it is applicable to what is known as a "fuselage side mounted engine". It should also be noted that the invention is equally applicable both to afterbodies incorporating thrust reverser doors, as described with reference to FIG. 1, and to afterbodies without these doors.

The invention claimed is:

1. A turboprop unit for an aircraft, comprising:
a jet engine having a fan casing and a gas exhaust system coaxial with an engine axis, the gas exhaust system including two afterbody half-cowlings, each hinged about a hinge axis to move from an open maintenance position to a closed position, the afterbody half-cowlings also connected, in the closed position, to a downstream end of the fan casing via a V-blade/V-groove structure for sealing and strain transmission,
wherein the hinge axes forms an angle α with the engine axis,
wherein the angle α is greater than 3°, and
wherein a joint plane between the afterbody half-cowlings and the downstream end of the fan casing forms an angle β with a perpendicular plane perpendicular to the engine axis such that a difference between the angle α and the angle β is less than or equal to 3°.

2. The turboprop unit as claimed in claim 1, wherein the angle α is less than or equal to 6°.

3. The turboprop unit as claimed in claim 1,
wherein the hinge axes are configured to be fixed to a pylon integrated in the structure of an aircraft wing for mounting the unit under the wing, and
wherein the hinge axes of the two afterbody half-cowlings converge towards each other in a downstream direction.

4. The turboprop unit as claimed in claim 1,
wherein the hinge axes are configured to be fixed to a pylon integrated in the structure of an aircraft wing for mounting the unit under the wing, and
wherein the hinge axes converge towards each other in a downstream direction, and
wherein an angle of convergence of the hinge axes, with respect to a longitudinal axis of the pylon, is about 1°.

5. The turboprop unit as claimed in claim 1, wherein the gas exhaust system further comprises a nozzle adjacent to a downstream edge of the half-cowlings.

6. The turboprop unit as claimed in claim 5, wherein the another V-blade/V-groove structure is provided between the downstream edge of the half-cowlings and an upstream edge of the nozzle.

7. A turboprop unit for an aircraft, comprising:
a jet engine provided with a fan casing and a gas exhaust system coaxial with an engine axis, the gas exhaust system including two afterbody half-cowlings, each hinged about a hinge axis to move from an open maintenance position to a closed position, the afterbody half-cowlings also connected, in the closed position, to a downstream end of the fan casing via a V-blade/V-groove structure for sealing and strain transmission,
wherein the hinge axes being fixed to a pylon integrated in the structure of an aircraft wing,
wherein the hinge axes converge towards each other in a downstream direction.

8. The turboprop unit as claimed in claim 7, wherein an angle of convergence δ of the hinge axes, with respect to a longitudinal axis of the pylon, is about 1°.

9. The turboprop unit as claimed in claim 7, wherein the gas exhaust system further comprises a nozzle adjacent to a downstream edge of the half-cowlings.

10. The turboprop unit as claimed in claim 9, wherein the another V-blade/V-groove structure is provided between the downstream edge of the half-cowlings and an upstream edge of the nozzle.

* * * * *